United States Patent
Mochizuki (10) Patent No.: US 7,542,408 B2
(45) Date of Patent: Jun. 2, 2009

(54) METHOD OF REDUCING INTER-SUBCARRIER INTERFERENCE IN MULTICARRIER COMMUNICATION SYSTEMS AND RECEIVER USING IT

(75) Inventor: Takashi Mochizuki, Tokyo (JP)

(73) Assignee: NEC Corporation, Kawasaki, Kanagawa (JP)

( * ) Notice: Subject to any disclaimer, the term of this patent is extended or adjusted under 35 U.S.C. 154(b) by 1127 days.

(21) Appl. No.: 10/364,557

(22) Filed: Feb. 12, 2003

(65) Prior Publication Data

US 2003/0152050 A1      Aug. 14, 2003

(30) Foreign Application Priority Data

Feb. 13, 2002    (JP)    ............... 2002-034791

(51) Int. Cl.
*H04J 11/00* (2006.01)
(52) U.S. Cl. .................. 370/206; 370/342; 370/209; 375/144; 375/148
(58) Field of Classification Search ......... 370/203–209, 370/328, 332, 335, 441, 465; 375/140, 144, 375/148; 455/63.1, 67.13
See application file for complete search history.

(56) References Cited

U.S. PATENT DOCUMENTS 5,790,549 A * 8/1998 Dent ........................... 370/479
2002/0181549 A1 * 12/2002 Linnartz et al. ............. 375/142

FOREIGN PATENT DOCUMENTS

| JP | 2000-151530 | 5/2000 |
| JP | 2001-308820 | 11/2001 |
| WO | WO 99/05832 | 2/1999 |

OTHER PUBLICATIONS

Japanese Office Action dated Sep. 7, 2004, with partial English translation
Yukitoshi Sanada, Masao Nakagawa "A Co-Channel Interference Cancellation Technique Utilizing Convolutional Codes and Orthogonal Multi-Carrier Modulation for Wireless Indoor Communications", The Institute of Electronics, Information and Communication Engineers, Jul. 25, 1995; vol. 95, No. 184, pp. 31-36, SST95-34-45.

* cited by examiner

*Primary Examiner*—Ricky Ngo
*Assistant Examiner*—Dady Chery
(74) *Attorney, Agent, or Firm*—McGinn IP Law Group, PLLC (57) ABSTRACT

A receiver of a multicarrier communication system capable of reducing inter-subcarrier interfering signals is to be provided. Receive signals received by a receiving antenna are amplified by a receiving amplifier, subjected to quadrature demodulation by multipliers with respect to the respective subcarriers, and band-limited by lowpass filters. The signals band-limited by the lowpass filters are converted into digital signals by A/D converters at a sampling frequency fs. With respect to the receive signals converted into digital signals, interfering signals leaking between subcarriers are estimated by using A/D converted by the A/D converters and are canceled. The receive signals reduced in interfering signals are multiplexed into a single sequence by a multiplexer, and decoded by a decoder into output signals.

10 Claims, 13 Drawing Sheets

METHOD OF REDUCING INTER-SUBCARRIER INTERFERENCE IN MULTICARRIER COMMUNICATION SYSTEMS AND RECEIVER USING IT

BACKGROUND OF THE INVENTION

1. Field of the Invention

The present invention relates to a method of reducing inter-subcarrier interference in multicarrier communication systems and a receiver using it, and more particularly to a receiver for use in multicarrier communication systems to suppress inter-subcarrier interference.

2. Description of the Related Art

Figure 2:
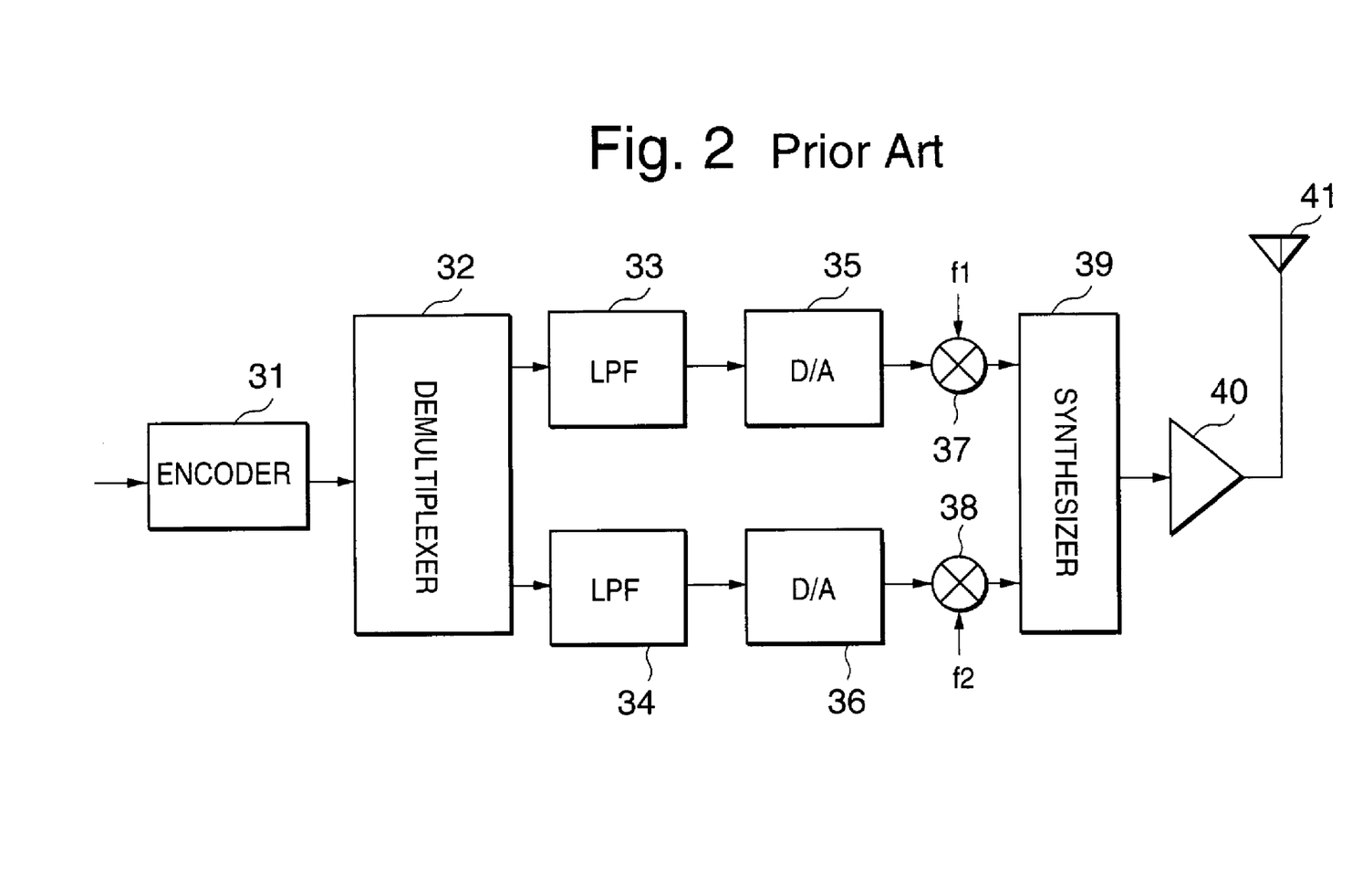
FIG. 2 is a block diagram illustrating the configuration of a transmitter in the conventional multicarrier communication system.

A conventional transmitter for use in multicarrier communication systems is configured of an encoder 31, a demultiplexer 32, lowpass filters (LPFs) 33 and 34, digital-to-analog (D/A) converters 35 and 36, multipliers 37 and 38, a synthesizer 39, a transmitting amplifier 40 and a transmitting antenna 41 as shown in FIG. 2.

Figure 1:
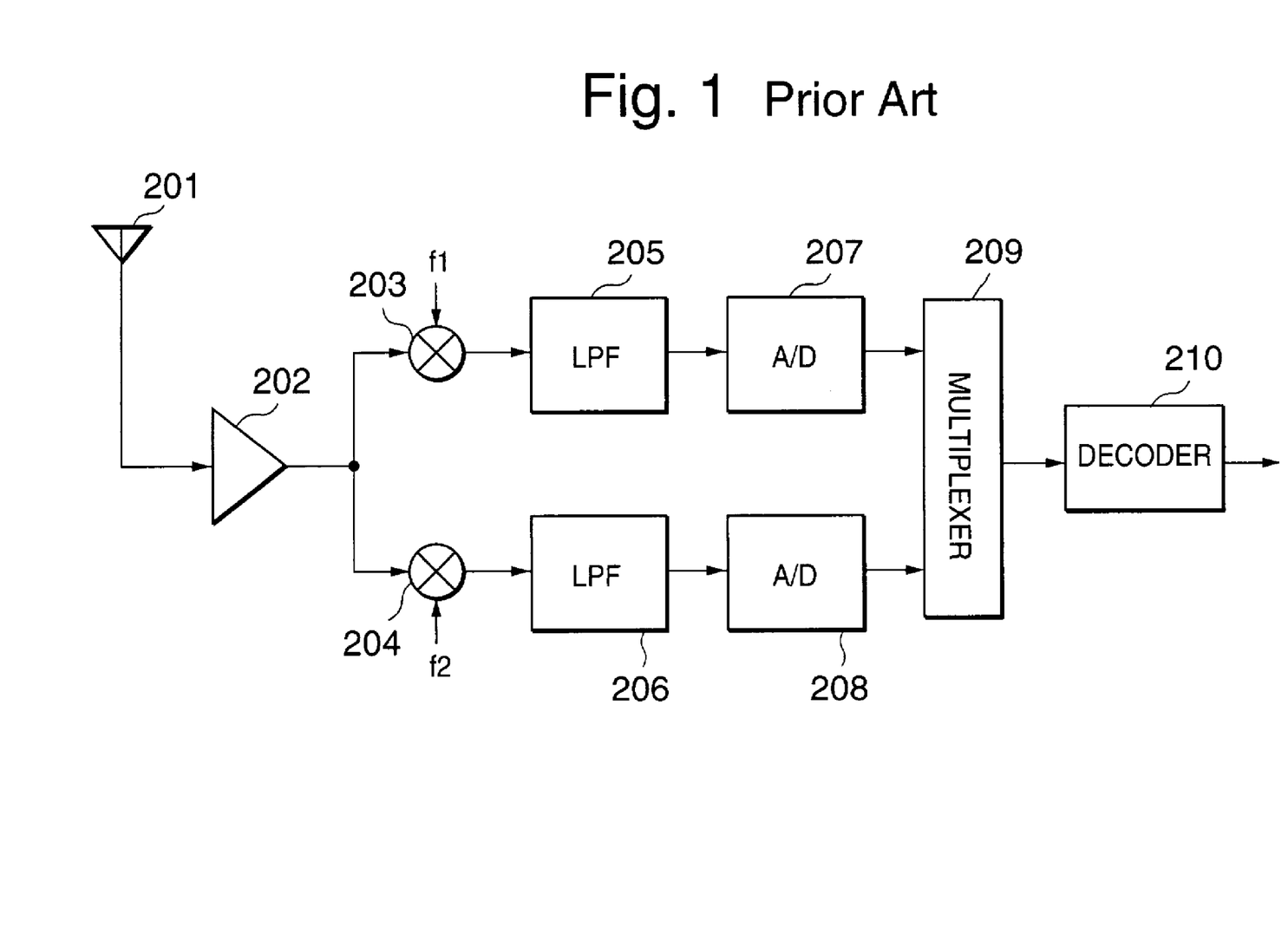
FIG. 1 is a block diagram illustrating the configuration of a receiver in a conventional multicarrier communication system.

A receiver for use in multicarrier communication systems is configured of a receiving antenna 201, a receiving amplifier 202, multipliers 203 and 204, lowpass filters (LPFs) 205 and 206, analog-to-digital (A/D) converters 207 and 208, a multiplexer 209 and a decoder 210 as shown in FIG. 1. The transmitter and the receiver mentioned above are supposed to use two subcarriers.

First in the transmitter, input signals are encoded by the encoder 31, and demultiplexed by the demultiplexer 32 into two sequences. Each of the sequences into which the signals have been demultiplexed by the demultiplexer 32 is bandwidth-limited by the lowpass filters 33 and 34.

The signals bandwidth-limited by the lowpass filters 33 and 34 are converted into analog signals by the D/A converters 35 and 36, and modulated by the multipliers 37 and 38 with respect to subcarriers. The signals modulated with respect to the subcarriers are mixed by the synthesizer 39, amplified by the transmitting amplifier 40, and transmitted from the transmitting antenna 41.

On the other hand in the receiver, receive signals received by the receiving antenna 201 are amplified by the receiving amplifier 202, subjected to quadrature demodulation by the multipliers 203 and 204 with respect to the respective subcarriers, and band-limited by the lowpass filters 205 and 206.

The receive signals band-limited by the lowpass filters 205 and 206 are converted into digital signals by the A/D converters 207 and 208 at a sampling frequency fs. The receive signals converted into digital signals are multiplexed into a single sequence by the multiplexer 209, and decoded by the decoder 210 into output signals.

In the multicarrier communication system, to prevent signal interference between subcarriers, the frequency band of each subcarrier is limited by the lowpass filters 33 and 34, and sufficient frequency spacing is ensured between the subcarriers to prevent the frequency bands of the subcarriers from overlapping each other or, in the orthogonal frequency division multiplexing (OFDM) system, the frequency bands of subcarriers are allowed to overlap each other by using mutually orthogonal subcarriers.

Figure 5:
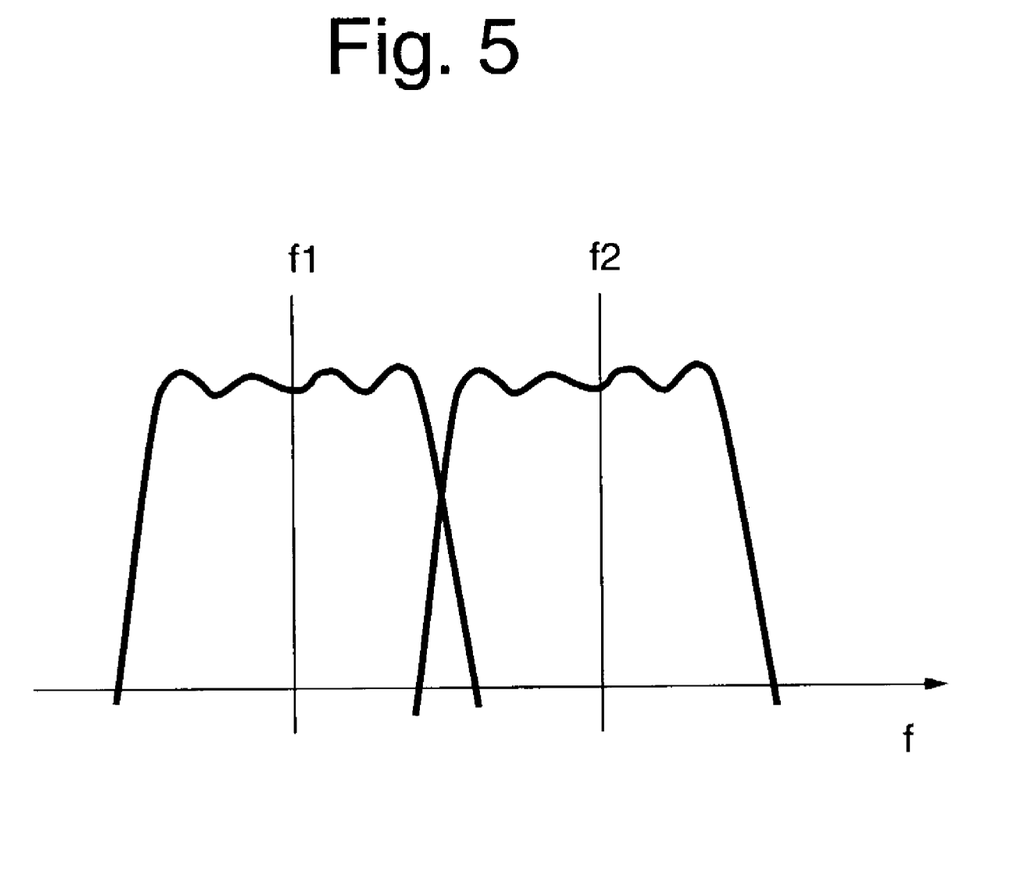
FIG. 5 shows frequency bands in a multicarrier communication system using two subcarriers.

However, in the receiver of the conventional multicarrier communication system described above, if the frequency bands of subcarriers overlap each other as shown in FIG. 5, signal interference occurs between the subcarriers, inviting a deterioration in reception performance.

Therefore, in the receiver of the conventional multicarrier communication system, the band limiting filters should have sufficient attenuation characteristic outside the bands, and the spacing between the subcarriers should be sufficiently wide.

Or in the OFDM system referred to above, as it uses mutually orthogonal subcarriers, the orthogonality cannot be maintained once waveforms are distorted on multiple paths, inviting signal interference between the subcarriers.

SUMMARY OF THE INVENTION

An object of the present invention is to provide a method of reducing inter-subcarrier interference in multicarrier communication systems capable of reducing inter-subcarrier interfering signals and a receiver using it.

By a method of reducing inter-subcarrier interference in multicarrier communication systems according to the invention, the fixed portion of the interference characteristic is figured out with respect to demodulated signals of each subcarrier by compensating for variations over time of phase components of the interfering signals between the subcarriers according to the ratio between the frequency difference between the subcarriers and the receive sampling frequency, the values of the interfering signals between the subcarriers are estimated by multiplying the fixed portion of the interference characteristic by the equivalent to the variations over time, and the estimated values of the interfering signals are subtracted from the demodulated signals of the subcarriers.

A receiver of a multicarrier communication system according to the invention is configured of:

a means of estimating from demodulated signals of each of the subcarriers interfering signals between the subcarriers, and a means of subtracting the interfering signals from the demodulated signals of the subcarriers, wherein:

the means of estimating the interfering signals estimates the values of the interfering signals by figuring out the fixed portion of the interference characteristic by compensating for variations over time of phase components of the interfering signals according to the ratio between the frequency difference between the subcarriers and the receive sampling frequency, and multiplying the fixed portion of the interference characteristic by the equivalent to the variations over time.

Thus, the receiver of the multicarrier communication system according to the invention is characteristic in that it is provided with an interfering signal reducer for reducing inter-subcarrier interfering signals with respect to digital signals of the subcarriers.

This interfering signal reducer performs processing to cancel interfering signals leaking from one adjacent subcarrier to another. Therefore, it is made possible to improve the reception quality on each subcarrier.

As hitherto described, the receiver of the multicarrier communication system according to the invention provides an advantage that interfering signals between subcarriers can be reduced by estimating interfering signals between subcarriers with respect to demodulated signals of each subcarrier and subtracting the interfering signals from the demodulated signals of the subcarrier

DETAILED DESCRIPTION OF THE PREFERRED EMBODIMENTS

Preferred embodiments of the present invention will be described below with reference to accompanying drawings.

Figure 3:
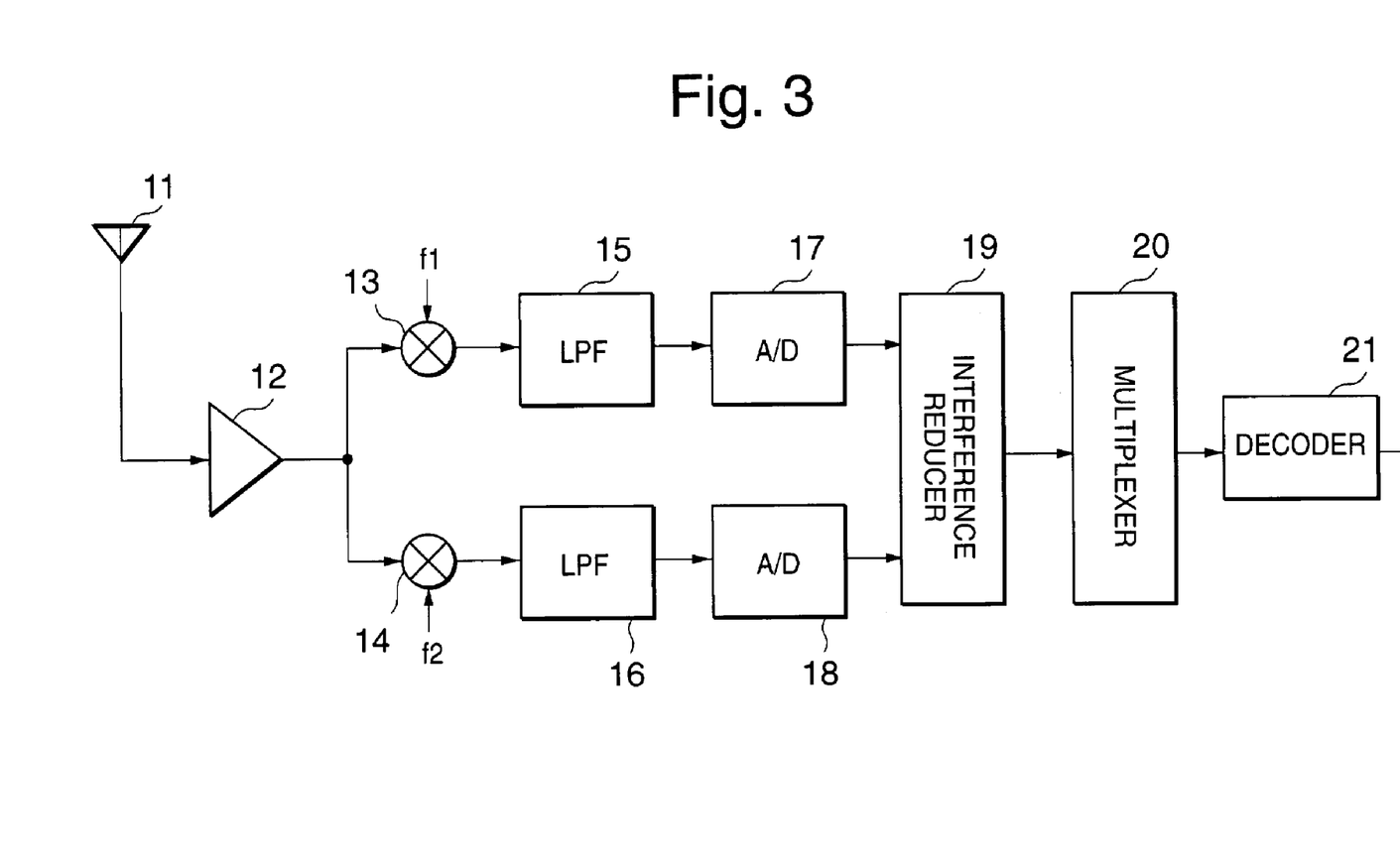
FIG. 3 is a block diagram illustrating the configuration of a receiver in a multicarrier communication system, which is a preferred embodiment of the invention.

FIG. 3 is a block diagram illustrating the configuration of a receiver in a multicarrier communication system, which is a preferred embodiment of the invention. Referring to FIG. 3, the receiver of the multicarrier communication system consists of a receiving antenna 11, a receiving amplifier 12, multipliers 13 and 14, lowpass filters (LPFs) 15 and 16, A/D (analog/digital) converters 17 and 18, an interference reducer 19, a multiplexer 20 and a decoder 21. Thus, the receiver of the multicarrier communication system, which is a preferred embodiment of the present invention, has a configuration comprising the conventional receiver shown in FIG. 1 plus the interference reducer 19.

In the receiver, signals received by the receiving antenna 11 are amplified by the receiving amplifier 12, subjected to quadrature demodulation by the multipliers 13 and 14 with respect to the respective subcarriers, and band-limited by the lowpass filters 15 and 16.

The signals band-limited by the lowpass filters 15 and 16 are respectively converted by the A/D converters 17 and 18 into digital signals at the sampling frequency fs. The receive signals converted into digital signals, after interfering signals among them are reduced by the interference reducer 19, are multiplexed into a single sequence by the multiplexer 20, and decoded by the decoder 21 into output signals.

Thus the interference reducer 19, using the signals of the subcarriers having undergone A/D conversion by the A/D converters 17 and 18, improves the reception quality by estimating and canceling interfering signals leaking between the subcarriers.

FIG. 2 is a block diagram illustrating the configuration of the transmitter of a conventional multicarrier communication system. Referring to FIG. 2, the transmitter of the multicarrier communication system consists of an encoder 31, a demultiplexer 32, lowpass filters (LPFs) 33 and 34, digital/analog (D/A) converters 35 and 36, multipliers 37 and 38, a synthesizer 39, a transmitting amplifier 40 and a transmitting antenna 41.

In the transmitter, input signals are encoded by the encoder 31 and demultiplexed by the demultiplexer 32 into two sequences. The sequences into which the signals have been demultiplexed by the demultiplexer 32 are band-limited by the lowpass filters 33 and 34.

The signals band-limited by the lowpass filters 33 and 34 are converted into analog signals by the D/A converters 35 and 36 and modulated by the multipliers 37 and 38 with respect to the subcarriers. The signals modulated with respect to the subcarriers are mixed by the synthesizer 39, amplified by the transmitting amplifier 40, and transmitted from the transmitting antenna 41.

Figure 4:
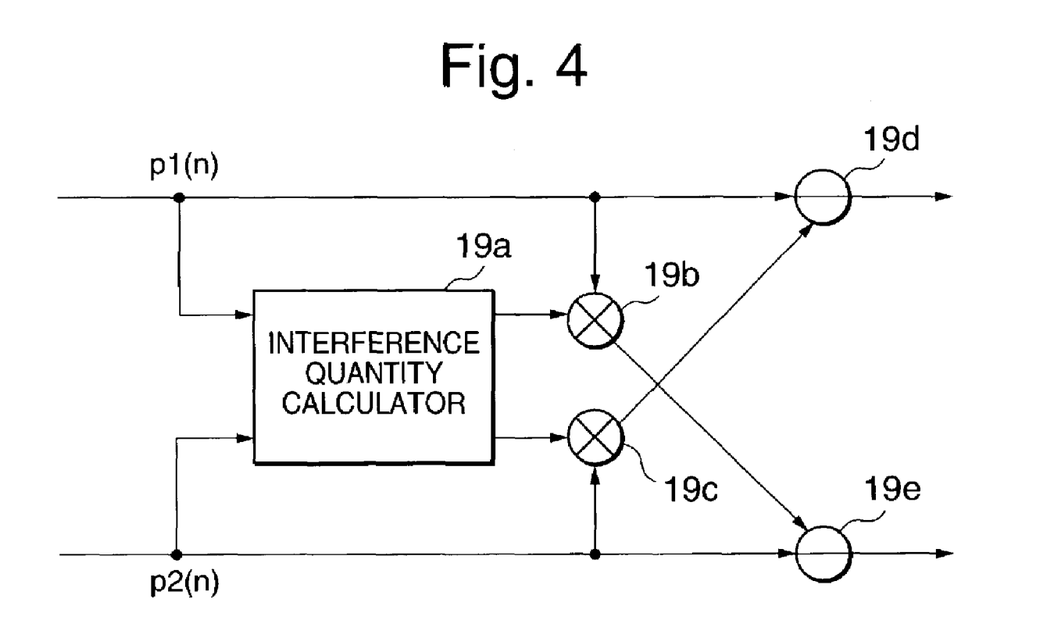
FIG. 4 is a block diagram illustrating the configuration of an interference reducer in FIG. 3.

FIG. 4 is a block diagram illustrating the configuration of the interference reducer 19 in FIG. 3. Referring to FIG. 4, the interference reducer 19 consists of an interference quantity calculator 19a, complex multipliers 19b and 19c, and subtractors 19d and 19e.

In the interference reducer 19, two-component (I/Q) signals having undergone quadrature demodulation are flowing on each signal line, and they are expressed in complex numbers. The interference quantity calculator 19a calculates or estimates the amplitudes and phase quantities of interfering signals leaking from a subcarrier 1 (f1) into a subcarrier 2 (f2), and notifies the complex multiplier 19b of its findings.

In the complex multiplier 19b, demodulated signals of the subcarrier 1 are multiplied by the amplitudes and phase quantities of the interfering signals notified from the interference quantity calculator 19a, and supplies the products to the subtractor 19d. The subtractor 19d subtracts the output of the multiplier 19b from the signals of the subcarrier 2 and supplies the differences.

Similarly, the interference quantity calculator 19a calculates or estimates the amplitudes and phase quantities of interfering signals leaking from the subcarrier 2 into the subcarrier 1, and the complex multiplier 19c multiplies the demodulated signals of the subcarrier 2 by the amplitudes and phase quantities of the interfering signals notified from the interference quantity calculator 19a, and the subtractor 19e subtracts the output of the multiplier 19c from the demodulated signals of the subcarrier 1.

Figure 6:
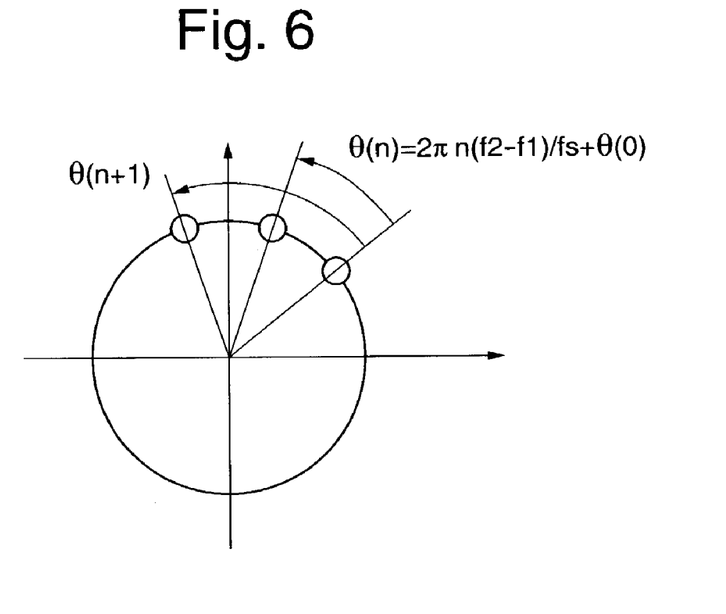
FIG. 6 is a diagram for describing the phase rotation of interfering signals between subcarriers.
Figure 7:
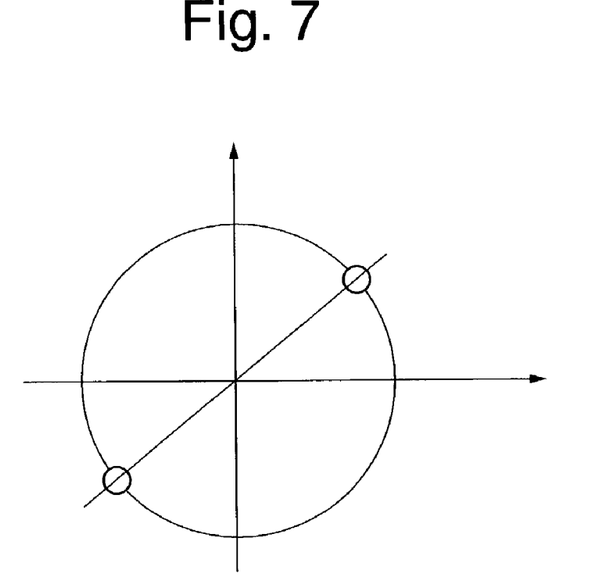
FIG. 7 is a diagram for describing the phase rotation of interfering signals whose receive sampling frequency is twice the frequency difference between subcarriers.

FIG. 5 shows frequency bands in a multicarrier communication system using two subcarriers, FIG. 6 is a diagram for describing the phase rotation of interfering signals between subcarriers, and FIG. 7 is a diagram for describing the phase rotation of interfering signals whose receive sampling frequency is twice the frequency difference between subcarriers.

Figure 13:
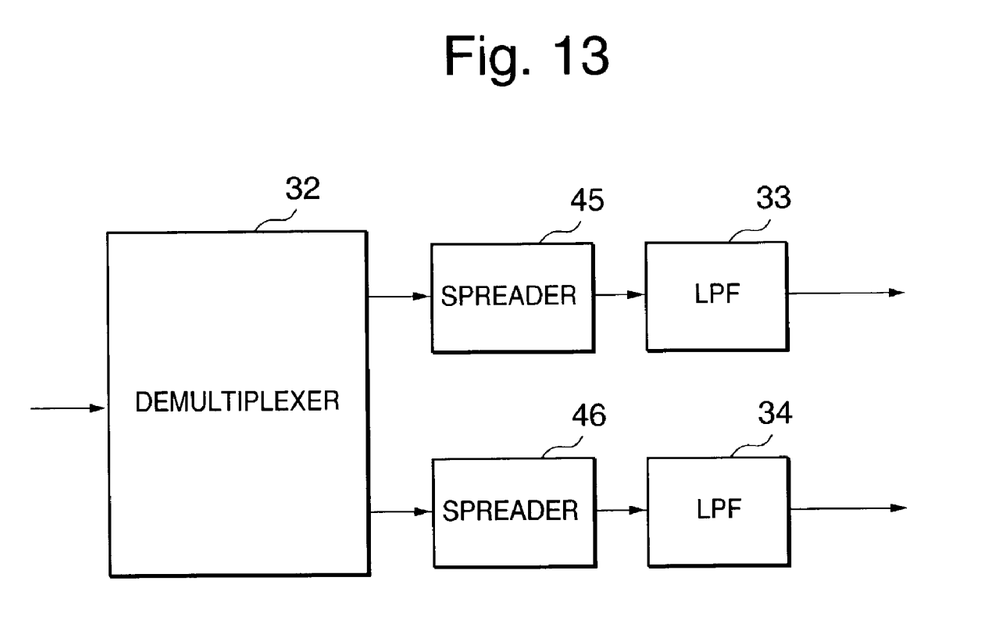
FIG. 13 is a block diagram illustrating the inserting position of the spreading means of the transmitter where the multicarrier communication system is a multicarrier/direct sequence code division multiple access system.
Figure 14:
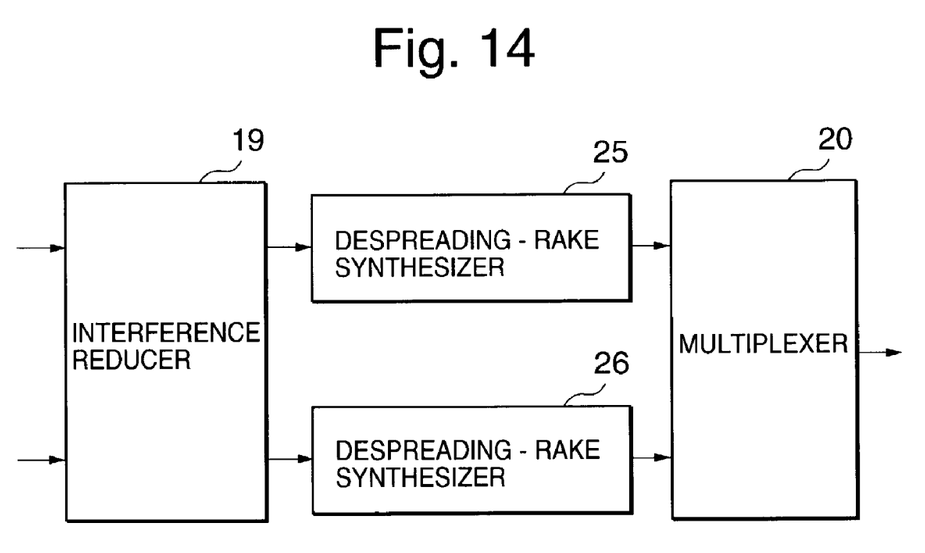
FIG. 14 is a block diagram illustrating the inserting position of the despreading-RAKE synthesizing means of the receiver where the multicarrier communication system is a multicarrier/direct sequence code division multiple access system.

FIG. 13 is a block diagram illustrating the inserting position of the spreading means of the transmitter where the multicarrier communication system is a multicarrier/direct sequence code division multiple access system, and FIG. 14 is a block diagram illustrating the inserting position of the despreading-RAKE synthesizing means of the receiver where the multicarrier communication system is a multicarrier/direct sequence code division multiple access system.

One preferred embodiment of the present invention will be described with reference to these FIG. 2 through FIG. 7, FIG. 13 and FIG. 14.

The amplitude characteristic of interference can be measured from the leakage of signals of a known series inserted into the signals of each subcarrier as pilot signals. Thus, the interference quantity calculator 19a measures the amplitudes of pilot signals of the subcarrier 1 leaking into the subcarrier 2.

While the phase characteristic can also be measured at the same time, as the phase characteristic rotates with the lapse of time as shown in FIG. 6 correspondingly to the relationship between the frequency difference between subcarriers and the sampling frequency, the calculation should take this factor into consideration.

First, the interference quantity calculator 19a measures the fixed portion of the phase characteristic net of variations over time, and adds the variations over time to the fixed portion in its output to the multiplier 19b.

This operation will be explained by using numerical expression.

In FIG. 4, p1(n) and p2(n) respectively representing the demodulated signals of the subcarrier 1 and the subcarrier 2 at a point of time n can be expressed by:

$$p1(n) = h1 \cdot d1(n) + a1 \cdot d2(n) \cdot \exp(j2n\pi(f2 - f1)/fs)$$

$$p2(n) = h2 \cdot d2(n) + a2 \cdot d1(n) \cdot \exp(j2n\pi(f1 - f2)/fs)$$

where d1(n) and d2(n) are the transmit data sequences of the respective subcarriers; h1 and h2, the transmission path characteristics of the respective subcarriers; and a1 and a2, the leak characteristics between the subcarriers.

The following calculation is done, with d1(n)* representing the complex conjugate of d1(n):

$$p1(n) \cdot d1(n)^* = h1 \cdot \|d1(n)\| + a1 \cdot d1(n) \cdot d2(n) \cdot \exp(j2n\pi(f2 - f1)/fs)$$

By accumulating the above-mentioned value for as many samples as the integral multiple of fs/(f2−f1), the influence of the second term can be reduced, and the transmission path characteristic coefficient h1 can be figured out from the first term. The transmission path characteristic coefficient h2 can be figured out from p2(n)·d2(n)* in a similar way. The transmission path characteristic coefficients so figured will be expressed as h1" and h2", respectively.

Then, the following calculation is done:

$$p1(n) \cdot d2(n)^* \cdot \exp(-j2n\pi(f2 - f1)/fs) =$$
$$h1 \cdot d1(n) \cdot d2(n)^* \cdot \exp(-j2n\pi(f2 - f1)/fs) + a1 \cdot \|(d2(n)\|$$

By accumulating the above-mentioned value for as many samples as the integral multiple of fs/(f2−f1), the influence of the first term can be reduced, and the leak characteristic coefficient a1 can be figured out from the second term. The leak characteristic coefficient a2 can be figured out in a similar way.

The following calculation is done, with the figured-out characteristic coefficients being expressed as a1" and a2", the interference quantity calculator 19a supplies the multiplier 19b with a2"/h1"·exp(j2nπ(f1−f2)/fs) and the multiplier 19c with a1"/h2"·exp(j2nπ(f2−f1)/fs).

The output signal of the subtractor 19d will be:

$$p1(n) - p2(n) \cdot a1''/h2'' \cdot \exp(j2n\pi(f2 - f1)/fs) =$$
$$h1 \cdot d1(n) + a1 \cdot d2(n) \cdot \exp(j2n\pi(f2 - f1)/fs) -$$
$$a1''/h2'' \cdot \exp(j2n\pi(f2 - f1)/fs) \cdot$$
$$(h2 \cdot d2(n) + a2 \cdot d1(n) \cdot \exp(j2n\pi(f1 - f2)/fs)) =$$
$$h1 \cdot d1(n) + d2(n) \cdot \exp(j2n\pi(f2 - f1)/fs) \cdot (a1 - a1'' \cdot h2/h2'') -$$
$$a1'' \cdot a2/h2'' \cdot d1(n)$$

As a1−a1"·h2/h2" is small in the second term and a1"·a2/h2" is small in the third term, the interference quantity can be reduced from the original interference quantity +a1·d2(n)·exp(j2nπ(f2−f1)/fs). Similarly, the interference quantity can be reduced for the output signal of the subtractor 19e.

Where the sampling frequency is exactly twice the frequency difference between subcarriers for instance, with the frequency tracking error of the receiver being deducted, the phase rotation will be fixed to two points as shown in FIG. 6, resulting in simplified calculation.

Where the multicarrier communication system is a multicarrier/direct sequence code division multiple access system, in the transmitter the signals of the subcarriers, which are the output of the demultiplexer 32, are spread by spreaders 45 and 46 as shown in FIG. 13, and in the receiver despreading-RAKE synthesizers 25 and 26 perform despreading-RAKE syntheses at a stage preceding the multiplexer 20 as shown in FIG. 14.

Where the multicarrier/direct sequence code division multiple access is used, the pilot signals may be either time-multiplexed or code-multiplexed with data.

Figure 8:
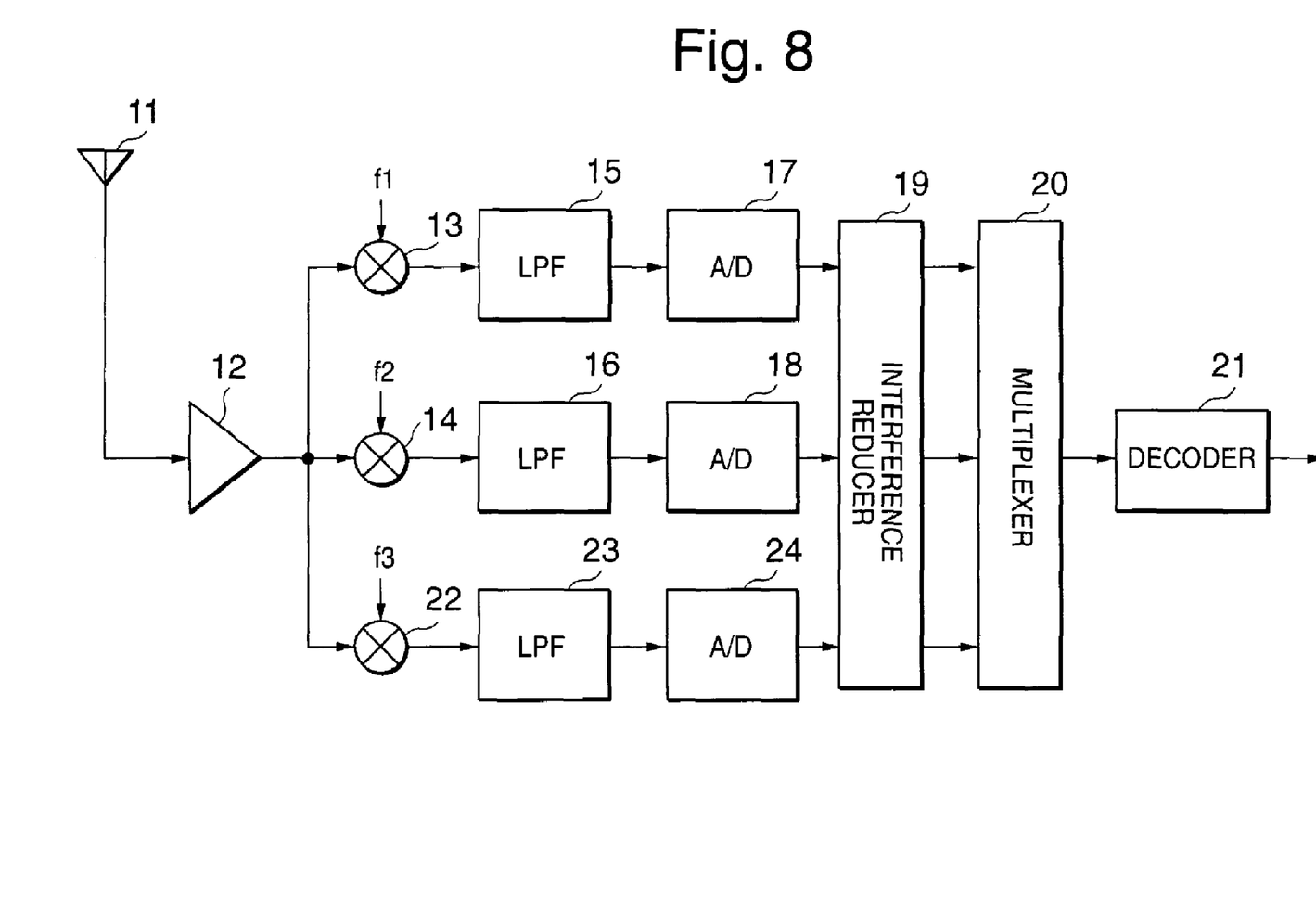
FIG. 8 is a block diagram illustrating the configuration of a receiver in a multicarrier communication system, which is another preferred embodiment of the invention.

FIG. 8 is a block diagram illustrating the configuration of the receiver of the multicarrier communication system, which is another preferred embodiment of the invention. The receiver of the multicarrier communication system shown in FIG. 8 has a configuration for three subcarriers, and this configuration is the same as the receiver of the multicarrier communication system in the earlier described embodiment shown in FIG. 3 except that there are added a multiplier 22, a lowpass filter 23 and an A/D converter 24. The same constituent elements as in FIG. 3 are denoted by respectively the same reference signs. In this embodiment, interfering signals among three subcarriers are reduced by the interference reducer 19.

Figure 9:
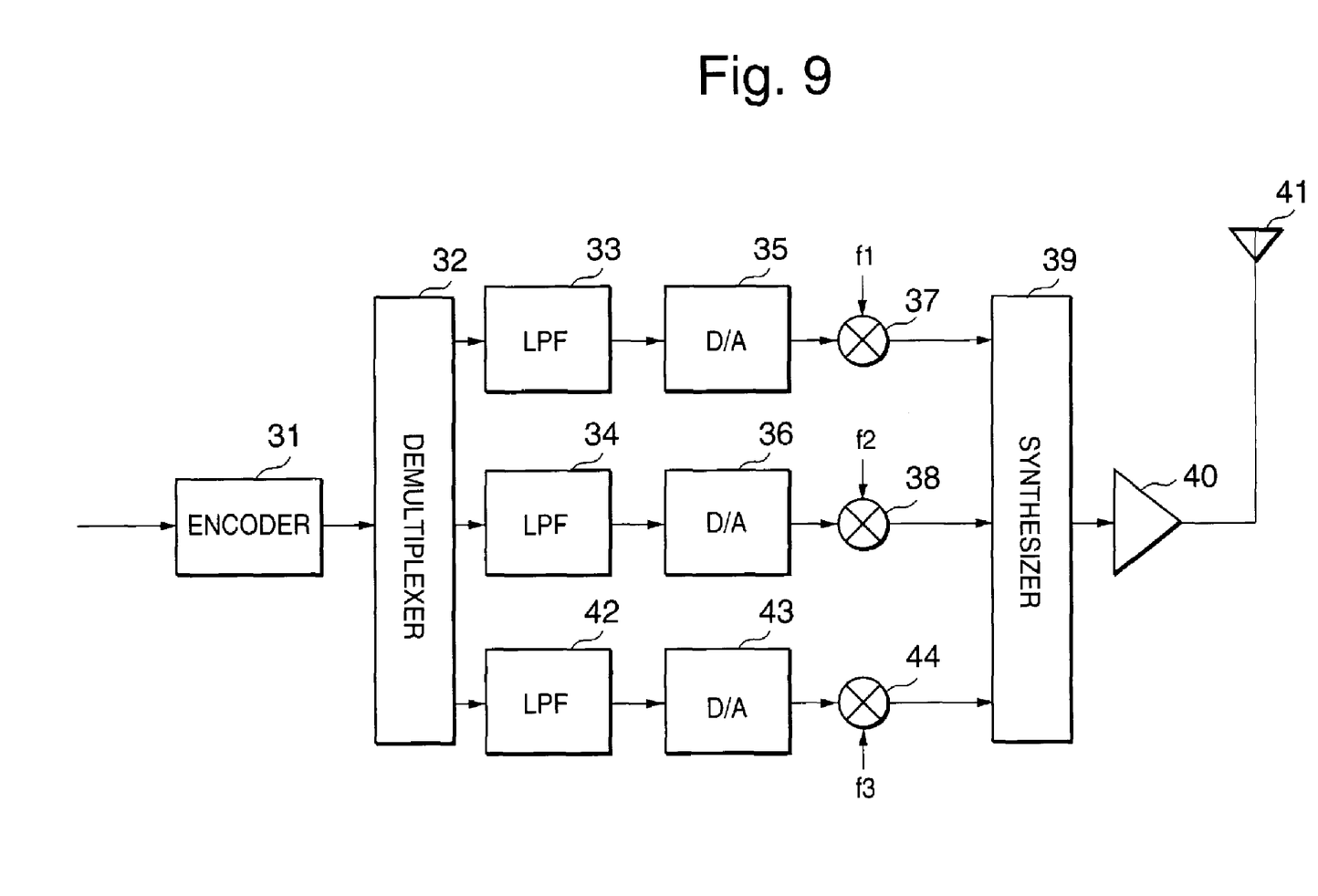
FIG. 9 is a block diagram illustrating the configuration of a transmitter in a conventional multicarrier communication system with three subcarriers.

FIG. 9 is a block diagram illustrating the configuration of the transmitter of the multicarrier communication system, which matches the other preferred embodiment of the invention. The transmitter of the multicarrier communication system shown in FIG. 9 has a configuration for three subcarriers, and this configuration is the same as the transmitter of the multicarrier communication system in the earlier described embodiment shown in FIG. 2 except that there are added a lowpass filter 42, a D/A converter 43 and a multiplier 44. The same constituent elements as in FIG. 2 are denoted by respectively the same reference signs.

Figure 10:
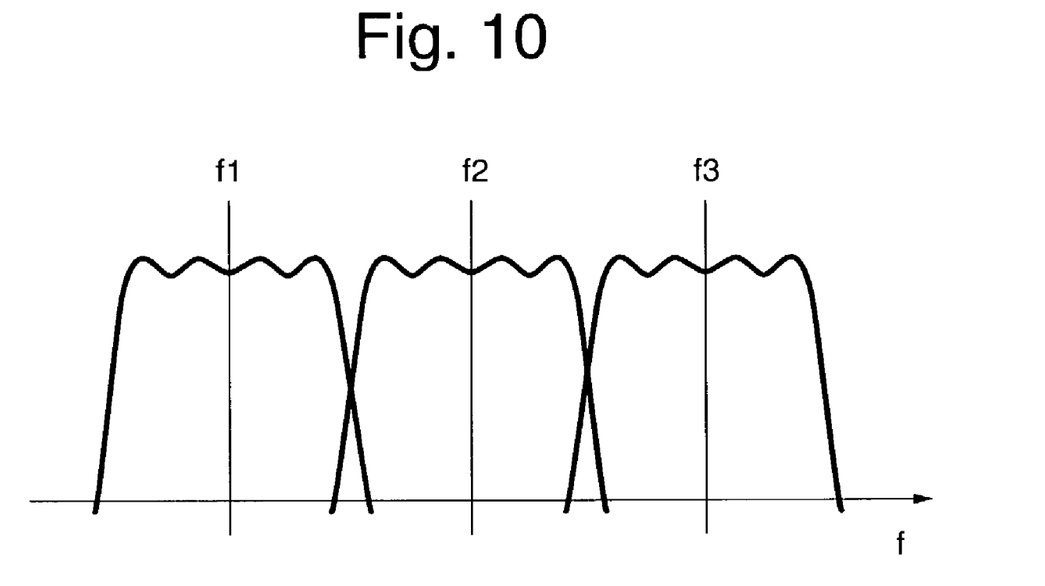
FIG. 10 shows frequency bands in a multicarrier communication system using three subcarriers.
Figure 11:
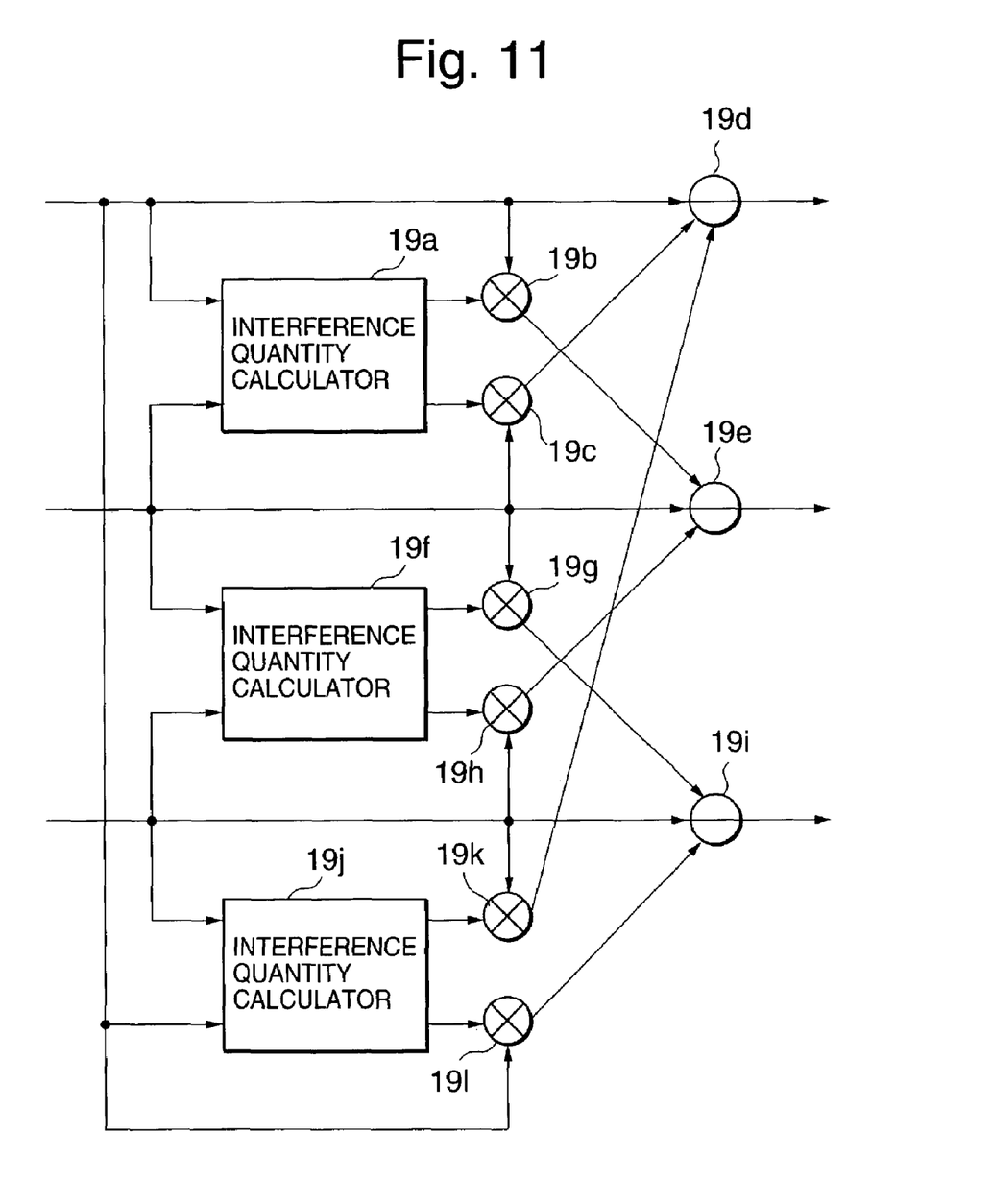
FIG. 11 is a block diagram illustrating the configuration of an interference reducer in FIG. 8.

FIG. 10 shows the frequency bands of the three subcarriers in the other preferred embodiment of the invention, and FIG. 11 is a block diagram illustrating the configuration of the interference reducer 19 in FIG. 8. The interference reducer 19 in FIG. 11 has a configuration in which the number of subcarriers is increased to three, and this configuration is the same as the interference reducer 19 shown in FIG. 4 except that there are added interference quantity calculators 19*f* and 19*j*, complex multipliers 19*g*, 19*h*, 19*k* and 19*l* and a subtractor 19*i*. The same constituent elements as in FIG. 4 are denoted by respectively the same reference signs.

Figure 12:
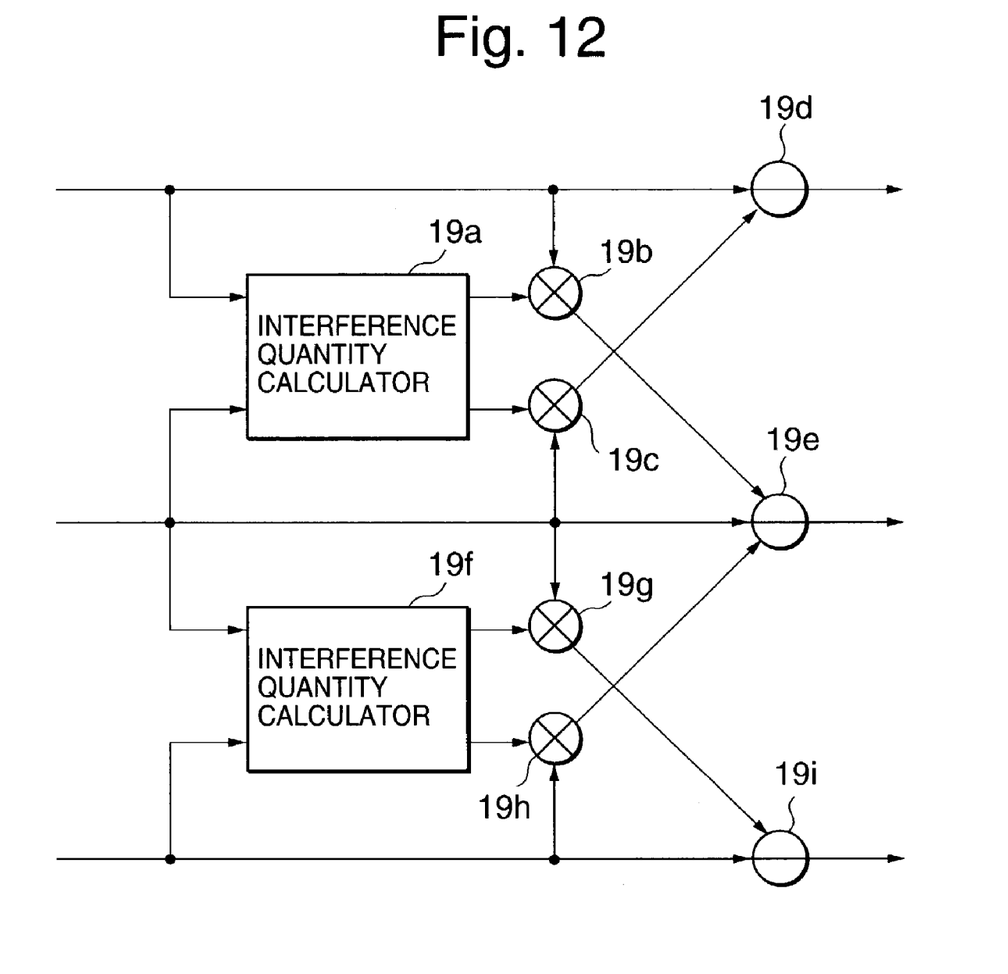
FIG. 12 is another block diagram illustrating the configuration of an interference reducer in FIG. 8.

FIG. 12 is another block diagram illustrating the configuration of the interference reducer 19 in FIG. 8. FIG. 12 shows a case in which the leaks between the subcarrier 1 and the subcarrier 3 are sufficiently small, and in this case it is possible to dispense with processing to reduce interference between the subcarrier 1 and the subcarrier 3. The interference reducer 19 in FIG. 12 has a configuration in which the number of subcarriers is increased to three as in FIG. 11, and this configuration is the same as the interference reducer 19 shown in FIG. 11 except that there are added an interference quantity calculator 19*j* and complex multipliers 19*k* and 19*l*. The same constituent elements as in FIG. 11 are denoted by respectively the same reference signs.

As hitherto described, in the receiver of the multicarrier communication system according to the present invention, interfering signals between subcarriers can be reduced by estimating and subtracting interfering signals leaking from one subcarrier to another in the receive digital signals of the subcarrier, and the quality of reception can be thereby improved.

As a result, it is possible to ease the performance requirements of the band limiting filters of the transmitter or to narrow the frequency spacing between subcarriers. To add, it is evident that the invention is not limited to the embodiments described above and that these embodiments can be modified as appropriate within the true scope and spirit of the invention.

What is claimed is:

1. A method of reducing inter-subcarrier interference in multicarrier communication systems, the method comprising:

estimating a quantity of interfering signals leaking between a first subcarrier and a second subcarrier with respect to demodulated signals of the first subcarrier and the second subcarrier by measuring a fixed portion of a phase quantity, and adding a variation over time portion of the phase quantity to the fixed portion of the phase quantity, wherein the variation over time portion of the phase quantity corresponds to a relationship between a frequency difference between the first subcarrier and the second subcarrier, and a receive sampling frequency; and subtracting the quantity of the interfering signals leaking between the subcarriers from the demodulated signals of the first subcarrier and the second subcarrier.

2. The method of reducing inter-subcarrier interference in multicarrier communication systems, as claimed in claim 1, the method further comprising:

in estimating a value of the quantity of interfering signals leaking between the subcarriers, with respect to receive signals in a section where a known signal sequence is being transmitted, after multiplying a plurality of demodulated signals of each subcarrier by complex conjugate signals of the known signals, estimating a transmission path characteristic of the subcarrier by integrating a multiple between the plurality of demodulated signals of each subcarrier and the complex conjugate signals of the known signals by a length of time proportional to a reciprocal of the frequency difference between the subcarriers, figuring the fixed portion of the interference characteristic by, after multiplying the plurality of demodulated signals of each subcarrier by the complex conjugate signals of known signals transmitted over the subcarrier to be cleared of interference and by a compensated phase rotation in each demodulated sample according to a ratio between the frequency difference between the subcarriers and the receive sampling frequency, integrating the multiple by a length of time proportional to the reciprocal of the frequency difference between the subcarrier, and estimating the quantity of interfering signals leaking between the subcarriers by multiplying the demodulated signals of the subcarrier to be cleared of interference by the fixed portion of the interference characteristic and by the phase rotation in the demodulated sampling position.

3. The method of reducing inter-subcarrier interference in multicarrier communication systems, as claimed in claim 1, wherein: the multicarrier communication system comprises a multicarrier/direct sequence code division multiple access.

4. The method of reducing inter-subcarrier interference in multicarrier communication systems, as claimed in claim 2, wherein: the multicarrier communication system comprises a multicarrier/direct sequence code division multiple access.

5. A receiver of a multicarrier communication system comprising:

an interference quantity calculator that estimates from demodulated signals of a plurality of subcarriers a quantity of the interfering signals leaking between the plurality of subcarriers; and a plurality of subtractors that subtracts the quantity of the interfering signals leaking between the plurality of subcarriers from the demodulated signals of the plurality of subcarriers, wherein the interference quantity calculator estimates values of the quantity of the interfering signals leaking between the plurality of subcarriers by measuring a fixed portion of a phase quantity, and adding a variation over time portion of the phase quantity to the fixed portion of the phase quantity, and wherein the variation over time portion of the phase quantity corresponds to a relationship between a frequency difference between the plurality of subcarriers and a receive sampling frequency.

6. The receiver of the multicarrier communication system as claimed in claim 5, wherein: the multicarrier communication system comprises a multicarrier/direct sequence code division multiple access.

7. The receiver of the multicarrier communication system as claimed in claim 5, wherein:

the interference quantity calculator comprises:

first multiplier that, with respect to receive signals in a section where a known signal sequence is being transmitted, multiplies demodulated signals of each of the plurality of subcarriers by complex conjugate signals of the known signals;

a first integrator that integrates a multiples between the demodulated signals of each of the plurality of subcarriers and the complex conjugate signals of the known signals by a length of time proportional to a reciprocal of the frequency difference between the plurality of subcarriers;

a second multiplier that multiplies the demodulated signals of each of the plurality of subcarriers by the complex conjugate signals of known signals transmitted over the subcarrier to be cleared of interference and by a compensated phase rotation in each demodulated sample according to a ratio between the frequency difference between the plurality of subcarriers and the receive sampling frequency;

a second integrator that integrates the output signals of the second multiplier by a length of time proportional to the reciprocal of the frequency difference between the plurality of subcarriers; and a third multiplier that multiplies the demodulated signals of the subcarrier to be cleared of interference by output signals of the first integrator and by a phase rotation in the demodulated sampling position.

8. The receiver of the multicarrier communication system as claimed in claim 7, wherein: the multicarrier communication system comprises a multicarrier/direct sequence code division multiple access.

9. A method of reducing inter-subcarrier interference in multicarrier communication systems, the method comprising:

estimating a quantity of interfering signals leaking between a first subcarrier and a second subcarrier;

multiplying a demodulated signal outputted from one of the first subcarrier and the second subcarrier with the quantity of interfering signal leaking between the first subcarrier and the second subcarrier; and subtracting the multiplied demodulated signal outputted from said one of the first subcarrier and the second subcarrier with the quantity of interfering signal leaking between the first subcarrier and the second subcarrier from the demodulated signals outputted from one of the first subcarrier and the second subcarrier.

10. A receiver of a multicarrier communication system comprising:

an interference quantity calculator that estimates a quantity of interfering signals leaking between a first subcarrier and a second subcarrier:

a complex multiplier that multiplies a demodulated signal outputted from one of the first subcarrier and the second subcarrier with the quantity of interfering signal leaking between the first subcarrier and the second subcarrier; and a subtractor that subtracts the multiplied demodulated signal outputted from said one of the first subcarrier and the second subcarrier with the quantity of interfering signal leaking between the first subcarrier and the second subcarrier from the demodulated signals outputted from said one of the subcarrier and the second subcarrier.

* * * * *